(12) United States Patent
Shinohara et al.

(10) Patent No.: US 9,975,414 B2
(45) Date of Patent: May 22, 2018

(54) VEHICLE-BODY STRUCTURE OF AUTOMOTIVE VEHICLE WITH STORING-TYPE ROOF

(71) Applicants: MAZDA MOTOR CORPORATION, Hiroshima (JP); NISHIKAWA RUBBER CO., LTD, Hiroshima-shi (JP)

(72) Inventors: Miwa Shinohara, Hatsukaichi (JP); Keiichiro Nishiura, Hatsukaichi (JP); Hiromu Oda, Hiroshima (JP); Akio Okayama, Hiroshima (JP)

(73) Assignees: MAZDA MOTOR CORPORATION, Hirsohima (JP); NISHIKAWA RUBBER CO., LTD, Hirsohima-shi (JP)

( * ) Notice: Subject to any disclaimer, the term of this patent is extended or adjusted under 35 U.S.C. 154(b) by 0 days. days.

(21) Appl. No.: 15/459,380

(22) Filed: Mar. 15, 2017

(65) Prior Publication Data
US 2017/0267088 A1 Sep. 21, 2017

(30) Foreign Application Priority Data
Mar. 18, 2016 (JP) .................. 2016-054767

(51) Int. Cl.
| | |
|---|---|
| *B60J 10/90* | (2016.01) |
| *B60J 10/74* | (2016.01) |
| *B60J 10/77* | (2016.01) |
| *B60J 10/21* | (2016.01) |
| *B60J 10/23* | (2016.01) |
| *B60J 10/25* | (2016.01) |
| *B60J 1/18* | (2006.01) |
| *B60J 7/00* | (2006.01) |
| *B60J 7/14* | (2006.01) |
| *B62D 25/04* | (2006.01) |

(52) U.S. Cl.
CPC ............. *B60J 10/90* (2016.02); *B60J 1/1823* (2013.01); *B60J 7/0084* (2013.01); *B60J 7/143* (2013.01); *B60J 10/21* (2016.02); *B60J 10/23* (2016.02); *B60J 10/25* (2016.02); *B60J 10/74* (2016.02); *B60J 10/77* (2016.02); *B62D 25/04* (2013.01)

(58) Field of Classification Search
CPC . B62D 25/04; B60J 10/23; B60J 10/90; B60J 10/74; B60J 10/77
USPC .................. 296/107.04, 193.06, 108, 107.07
See application file for complete search history.

(56) References Cited

U.S. PATENT DOCUMENTS

| | | | |
|---|---|---|---|
| 6,443,519 B1 * | 9/2002 | Betzl ...................... | B60J 7/0084 296/146.9 |
| 2014/0035312 A1 | 2/2014 | Schulzki | |

* cited by examiner

*Primary Examiner* — Dennis H Pedder
(74) *Attorney, Agent, or Firm* — Studebaker & Brackett PC

(57) ABSTRACT

There are provided a pillar attached to a vehicle-body side separately from a roof, a pillar-side weather strip provided at the pillar, a vehicle-body-side weather strip provided at a vehicle-body side of a lower portion of the pillar, and an engagement portion provided at a lower end portion of the pillar-side weather strip, the engagement portion being configured to engage from an inward side, in a vehicle width direction, of the vehicle-body-side weather strip. The vehicle-body-side weather strip comprises a guide portion which guides the engagement portion of the pillar-side weather strip inward and downward, an engaged portion positioned at a lower portion of the guide portion, and a wall portion which contacts a hanging piece provided at the lower end portion of the pillar-side weather strip from an outward side in the vehicle width direction.

4 Claims, 11 Drawing Sheets

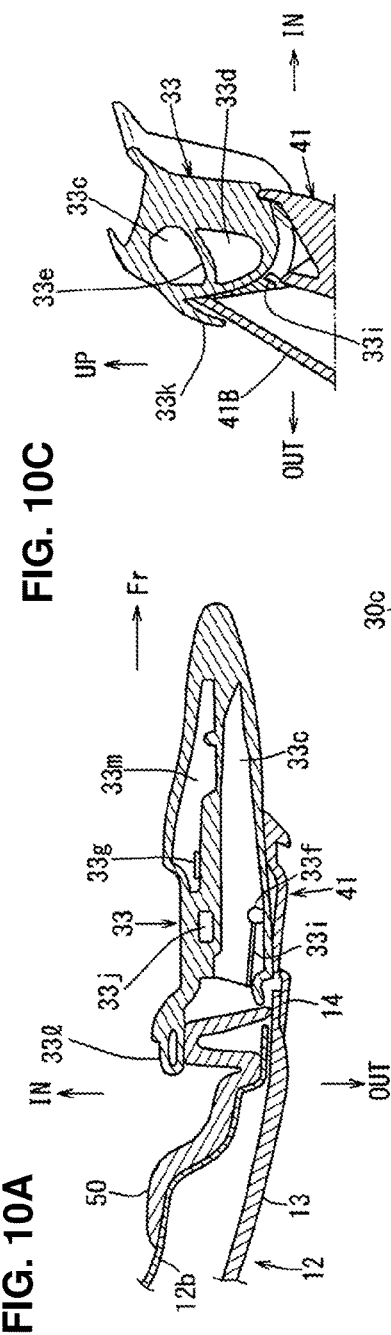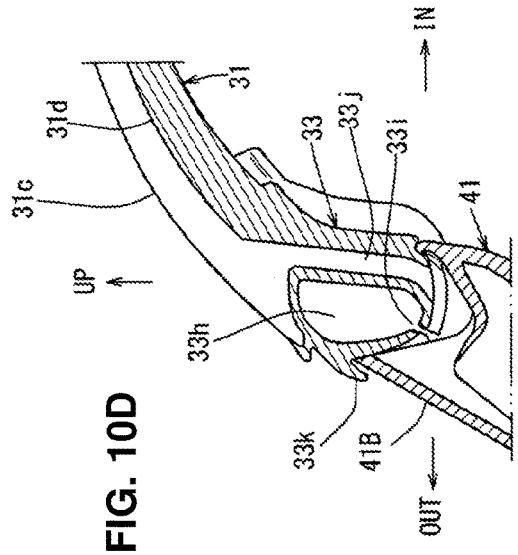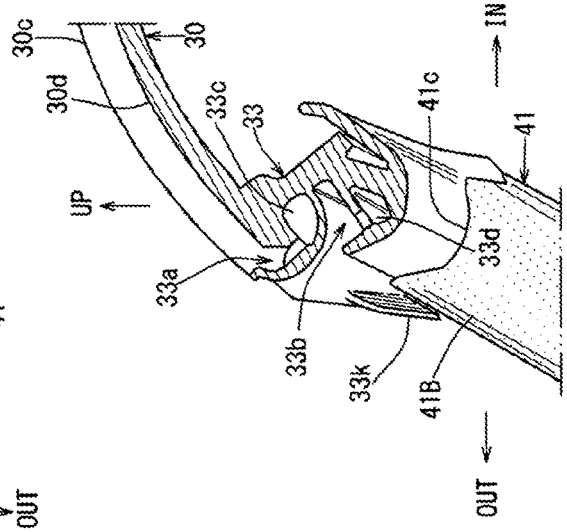

VEHICLE-BODY STRUCTURE OF AUTOMOTIVE VEHICLE WITH STORING-TYPE ROOF

BACKGROUND OF THE INVENTION

The present invention relates to a vehicle-body structure of an automotive vehicle with a storing-type roof which comprises at least a front roof and a rear roof and is configured to have a roof fully-closed position in which an upper side of a cabin is covered with these roofs and a stored position (a roof fully-open position) in which these roofs are stored in a storing space provided behind a seat.

Conventionally, in the above-described vehicle-body structure of the automotive vehicle with the storing-type roof, a pillar is necessary for the purpose of supporting the rear roof, in particular, in a case where the upper side of the cabin is covered with the front roof and the rear roof.

In a case where the pillar is provided separately from the roof and configured as a roof-side unit, when the roof is assembled to a vehicle body in a hanging manner, the above-described pillar is so offset inward that assembling of the pillar becomes complex. Therefore, there is room for improvement in this regard.

Meanwhile, US Patent Application Publication No. 2014/0035312 A1 discloses a deck cover structure, comprising a rear window which interconnects, by an upper face portion thereof, right-and-left both side portions, each of which is configured such that the height thereof becomes gradually lower from a vehicle front side to a vehicle rear portion, and a frame member which is provided at a front end portion of the rear window and configured in a gate shape in a front view. This patent document, however, does not disclose or suggest any pillar which is provided separately from the deck cover at all.

SUMMARY OF THE INVENTION

Accordingly, an object of the present invention is to provide a vehicle-body structure of an automotive vehicle with a storing-type roof which can secure the assembling workability and the sealing of the pillar which is provided separately from the roof.

The vehicle-body structure of the automotive vehicle with the storing-type roof according to the present invention comprises a pillar attached to a vehicle-body side separately from the roof, a pillar-side weather strip provided at the pillar, a vehicle-body-side weather strip provided at a vehicle-body side of a lower portion of the pillar, and an engagement portion provided at a lower end portion of the pillar-side weather strip, the engagement portion being configured to engage from an inward side, in a vehicle width direction, of the vehicle-body-side weather strip, wherein the vehicle-body-side weather strip comprises a guide portion which guides the engagement portion of the pillar-side weather strip inward and downward, an engaged portion positioned at a lower portion of the guide portion, and a wall portion which contacts a hanging piece provided at the lower end portion of the pillar-side weather strip from an outward side in the vehicle width direction.

According to the above-described structure, since the pillar provided separately from the roof is attached to the vehicle-body side, the assembling workability of the pillar can be secured. Further, since poisoning of the engagement portion of the pillar-side weather strip is conducted by making the engagement portion engage with the engaged portion of the vehicle-body-side weather strip after the engagement portion is guided inward and downward by the guide portion of the vehicle-body-side weather strip and also the wall portion contacts the hanging piece provided at the lower end portion of the pillar-side weather strip from the outward side in the vehicle width direction, the sealing can be secured. That is, both securing of the sealing and the assembling workability of the pillar provided separately from the roof can be compatibly attained.

In an embodiment of the present invention, the pillar includes a weather-strip engagement groove which extends in a vertical direction along the pillar and has substantially an identical cross section, and said pillar-side weather strip comprises a vertical-direction middle portion to engage with the weather-strip engagement groove and an upper portion to engage with a roof-side weather strip, covering over the pillar.

According to this structure, since the upper portion of the pillar-side weather strip is interposed between the pillar and the roof-side weather strip, the sealing by means of the pillar-side weather strip can be secured. Further, since the pillar has substantially the identical cross section, the pillar can be made of extrusion molding or roll forming article, thereby securing the pillar formability. That is, according to this structure, securing of the sealing and securing of the pillar formability can be compatibly attained.

In another embodiment of the present invention, the pillar is attached to a vehicle-body attaching member of a storing roof module.

According to this structure, when the roof is assembled to the vehicle body in a hanging manner, the pillar can be guided by the vehicle-body-side weather strip even if the pillar is offset inward or outward, so that instability of the storing roof module can be compensated. Consequently, modularization and the assembling workability of the pillar and the storing roof can be improved.

Other features, aspects, and advantages of the present invention will become apparent from the following description which refers to the accompanying drawings.

BRIEF DESCRIPTION OF THE DRAWINGS

FIG. 10A-10D are sectional views: FIG. 10A being a sectional view taken along line A-A of FIG. 2; FIG. 10B being a sectional view taken along line B-B of FIG. 2; FIG. 10C being a sectional view taken along line C-C of FIG. 2; and FIG. 10D being a sectional view taken along line D-D of FIG. 2.

FIG. 11A being a sectional view taken along line E-E of FIG. 2; FIG. 11B being a sectional view taken along line O-O of FIG. 2; FIG.

11C being a sectional view taken along line P-P of FIG. 2; and FIG. 11D being a sectional view taken along line Q-Q of FIG. 2.

DETAILED DESCRIPTION OF THE INVENTION

Figure 1:
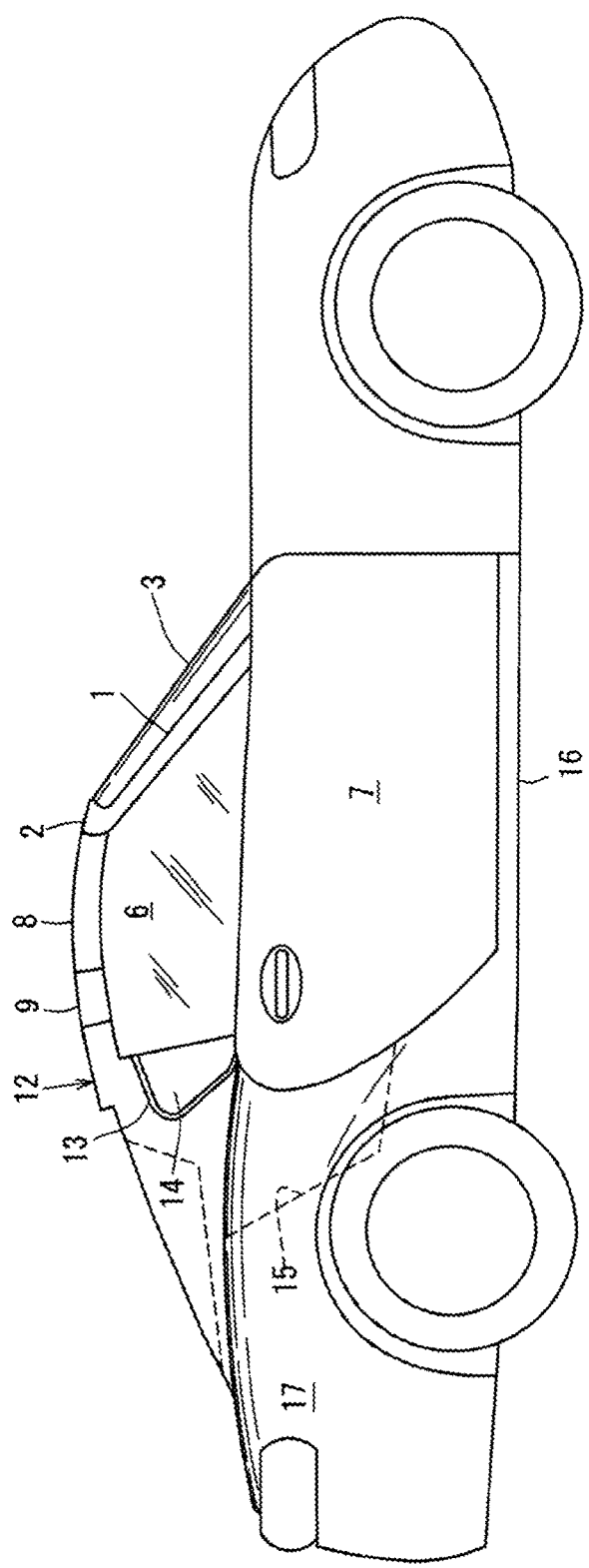
FIG. 1 is a side view of external appearance of an automotive vehicle with a storing-type roof which is provided with a seal structure of the present invention.
Figure 2:
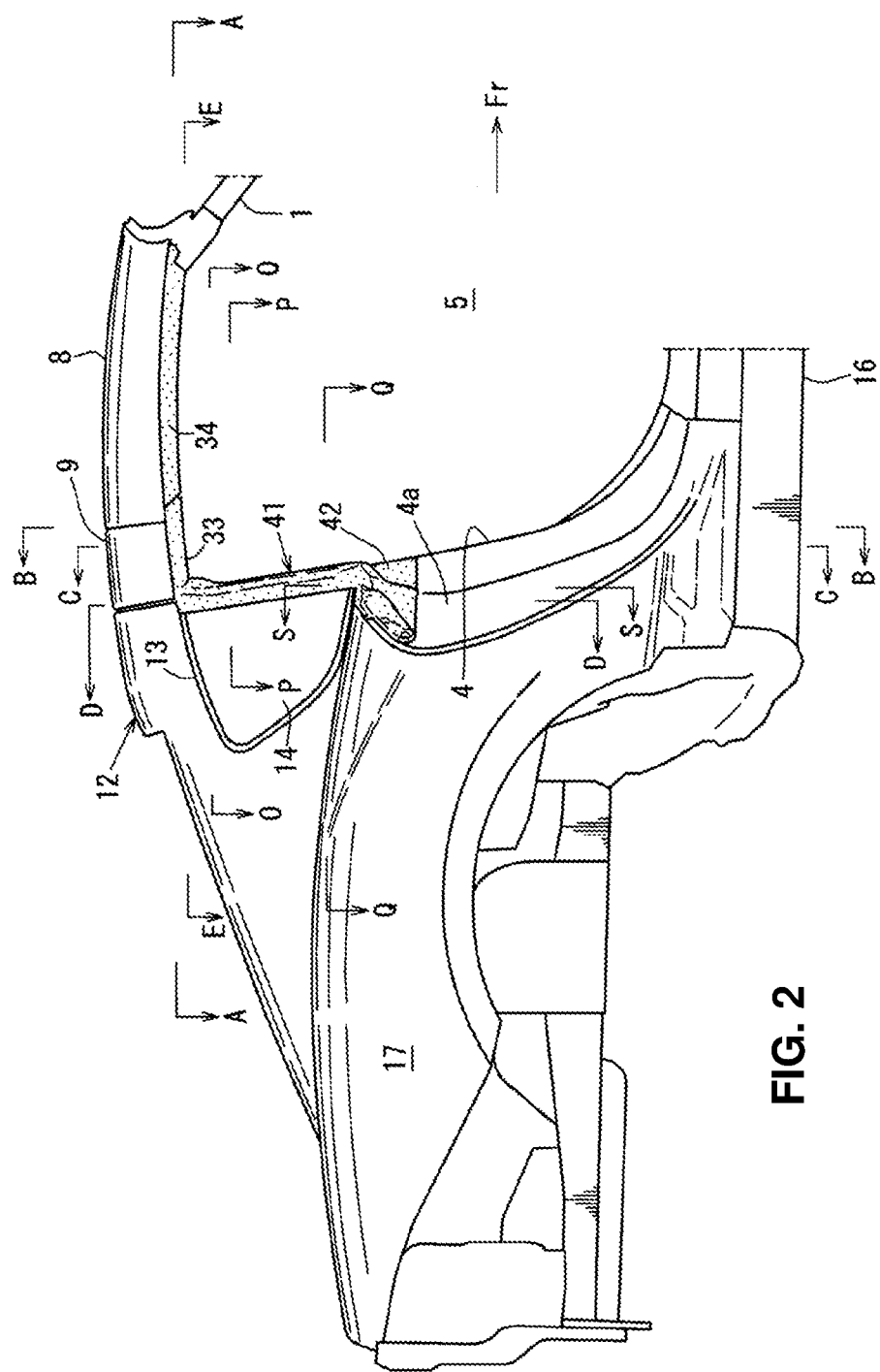
FIG. 2 is an enlarged side view of a major part of FIG. 1.

An embodiment of the present invention will be described specifically referring to the drawings. The drawings show a vehicle-body structure of an automotive vehicle with a storing-type roof, and FIG. 1 is a side view of external appearance of the automotive vehicle with the storing-type roof which is provided with the present seal structure and FIG. 2 is an enlarged side view of a major part of FIG. 1. Herein, since the seal structure and the vehicle-body structure of the present embodiment are respectively symmetrical or substantially symmetrical, the drawings show respective right-side structures only.

In FIGS. 1 and 2, a pair of right-and-left front pillars 1, 1 are provided, and a front header 2 which interconnect respective upper ends of the pair of right-and-left front pillars 1, 1 is provided. Further, a front window (windshield) glass 3 is attached to a portion enclosed by the pair of right-and-left front pillars 1, 1 and the front header 2.

A cabin 5 is provided in back of the front pillar 1 and a hinge pillar, not illustrated, such that the cabin 5 is continuous to a door opening portion for passenger's ingress/egress 4, and this door opening portion 4 is configured to be opened or closed by a side door 7 including a door window glass 6.

Further, an upper side of the above-described cabin 5 is configured to be opened or closed by a front roof 8, a rear roof 9, a glass unit 11 including a rear window glass 10 (see FIG. 3), and a deck cover 12 having an opening of the glass unit 11.

A quarter-window arrangement portion 13 is provided at a side portion of the above-described deck cover 12, and a quarter window panel 14 is integrally attached to an outward side, in a vehicle width direction, of the quarter-window arrangement portion 13. Further, a roof storing portion 15 where the font roof 8, the rear roof 9, and the glass unit 11 are stored is formed at a vehicle-body inner portion which is positioned right behind a driver's seat and a passenger seat (not illustrated) which are arranged in the cabin 5. In FIGS. 1 and 2, reference character 16 denotes a side sill, and reference character 17 denotes a rear fender.

Figure 3:
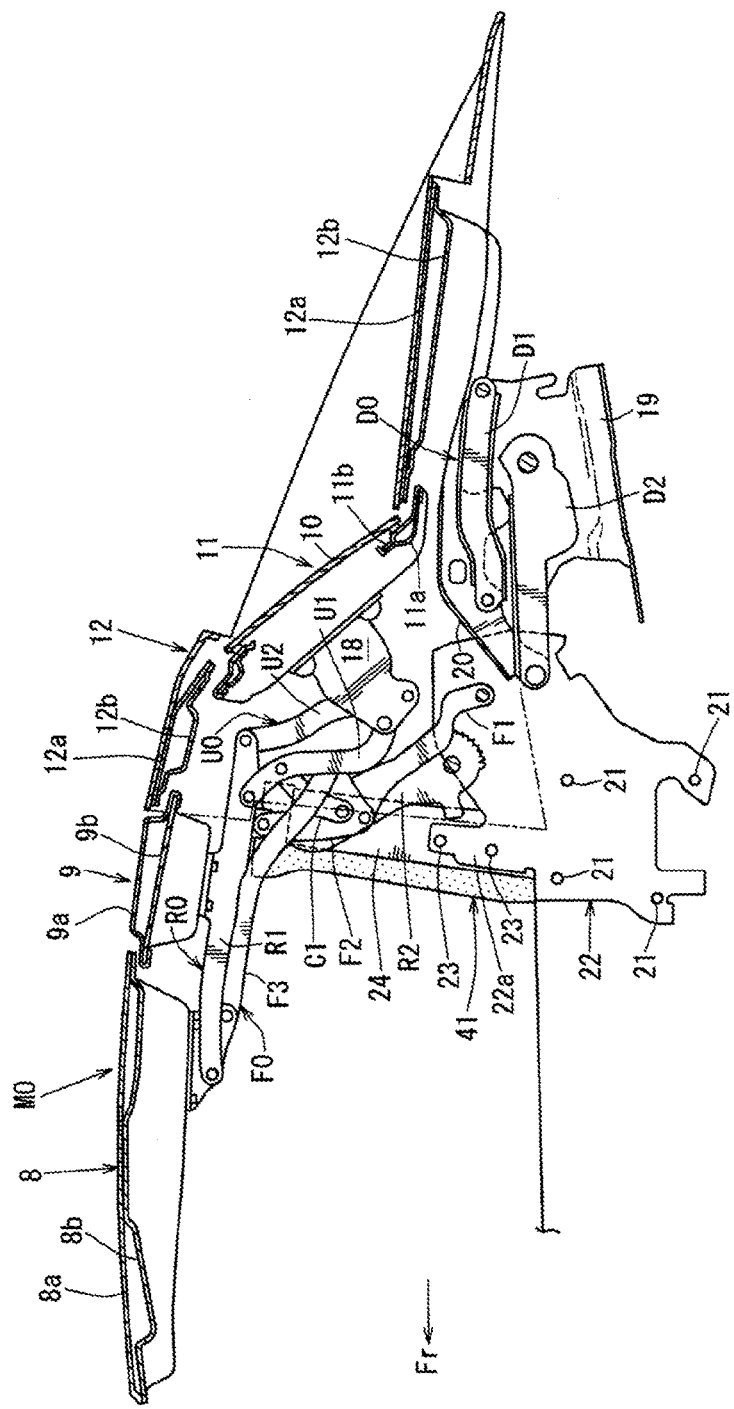
FIG. 3 is a side view showing a link support structure of a storing-type roof.

FIG. 3 is a side view showing a link support structure of the storing-type roof. The above-described front roof 8 comprises a roof outer panel 8a and a roof inner panel 8b, and the rear roof 9 comprises a roof outer panel 9a and a roof inner panel 9b. Likewise, the glass unit 11 comprises a front panel 11a and a rear panel 11b, and the deck cover 12 comprises an outer panel 12a and an inner panel 12b.

Further, the above-described front roof 8 is openably supported by a front-roof support link mechanism FO which comprises respective links F1, F2, F3, the above-described rear roof 9 is openably supported by a rear-roof support link mechanism RO which comprises respective links R1, R2 which are integrally connected in a roughly T shape in a side view, the glass unit 11 is openably supported by a glass-unit support link mechanism UO which comprises respective links U1, U2 and a bracket 18, and the deck cover 12 is openably supported by a deck-cover support link mechanism DO which comprises a pair of links D1, D2, a fixing bracket 19 fixed to a vehicle-body side, and a movable bracket 20 fixed to a lower portion of the inner panel 12b. Moreover, the link F2 of the front-roof support link mechanism FO and the link U1 of the glass-unit support link mechanism UO are connected to each other by a connecting link C1.

Further, as shown in FIG. 3, a base bracket 22 is attached to a vehicle-body-side wall by using plural attaching members 21 . . . , and a pillar 24 as a vehicle-body-side pillar portion is attached to a front upper portion 22a of the base bracket 22 by using plural attaching members 23, 23. The pillar 24 is attached to the vehicle-body side separately from the roof (see the front roof 8, the rear roof 9, the glass unit 11, and the deck cover 12).

Herein, a storing roof module MO is constituted by the front roof 8, the rear roof 9, the glass unit 11, the link RO, and the link mechanisms FO, UO, and the above-described pillar 24 is attached to the base bracket 22 which is the vehicle-body attaching member of the storing roof module MO.

Figure 4:
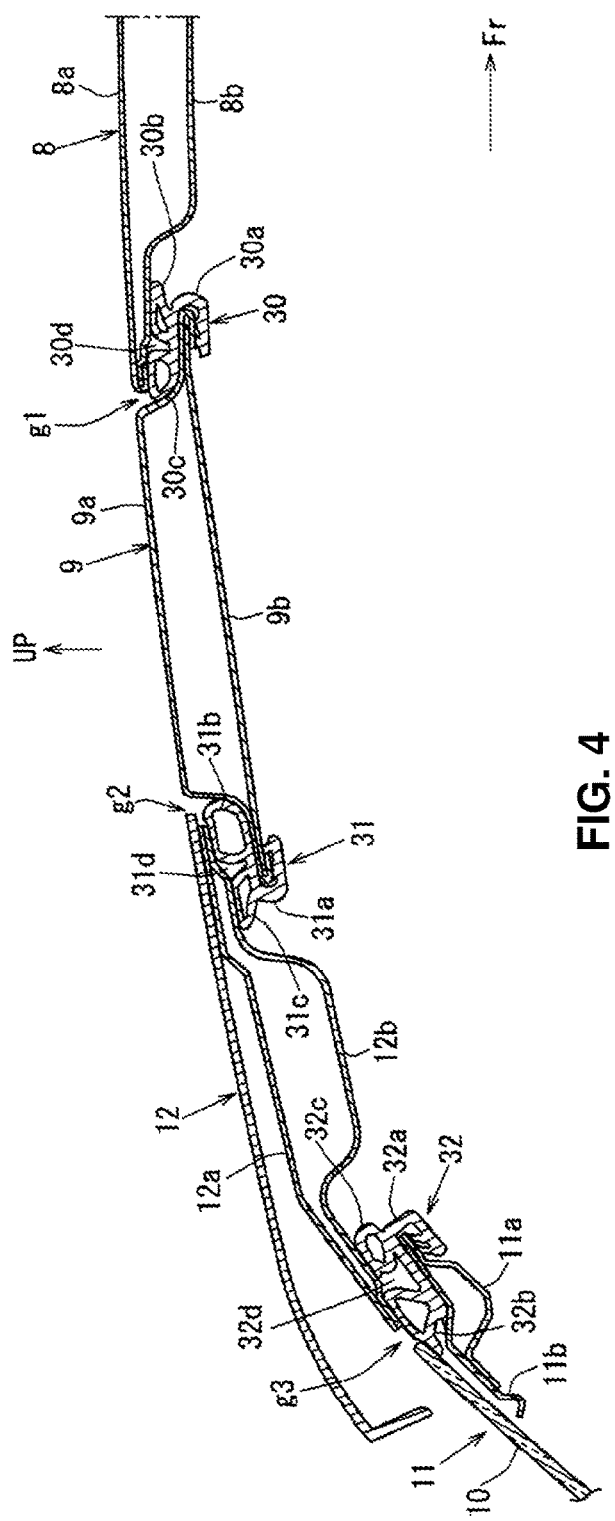
FIG. 4 is a side view showing a seal structure of plural roof members.

FIG. 4 is a side view showing the seal structure of plural roof members.

As shown in FIG. 4, a gap g1 is formed between a rear end of the front roof 8 as the first roof member and a front end of the rear roof 9 as the second roof member. A gap g2 is formed between a rear end of the rear roof 9 as the second roof member and the deck cover 12 as the third roof member. A gap g3 is formed between the deck cover 12 and the glass unit 11. The above-described gap g1 is sealed by a front roof weather strip 30, the above-described gap g2 is sealed by a rear roof weather strip 31, and the above-described gap g3 is sealed by a ring-shaped weather strip 32 (see FIG. 6).

As shown in FIG. 4, the front weather strip 30 comprises a base portion 30a which interposes a panel joint portion of the rear roof 9 and front-and-rear seal portions 30b, 30c which are formed in a hollow shape, respectively, which are formed integrally. A recess groove 30d is formed between the roof seal portions 30b, 30c. Likewise, the rear weather strip 31 comprises a base portion 31a which interposes the panel joint portion of the rear roof 9 and front and rear seal portions 31b, 31c which are formed in a hollow shape, respectively, which are formed integrally. A recess groove 31d is formed between the roof seal portions 31b, 31c.

The ring-shaped weather strip 32 comprises a base portion 32a which interposes a panel joint portion of the glass unit 11 and inner-and-outer peripheral seal portions 32b, 32c which are formed in a hollow shape, respectively, which are formed integrally. A recess groove 32d is formed between the inner-and-outer peripheral seal portions 32b, 32c.

Figure 5:
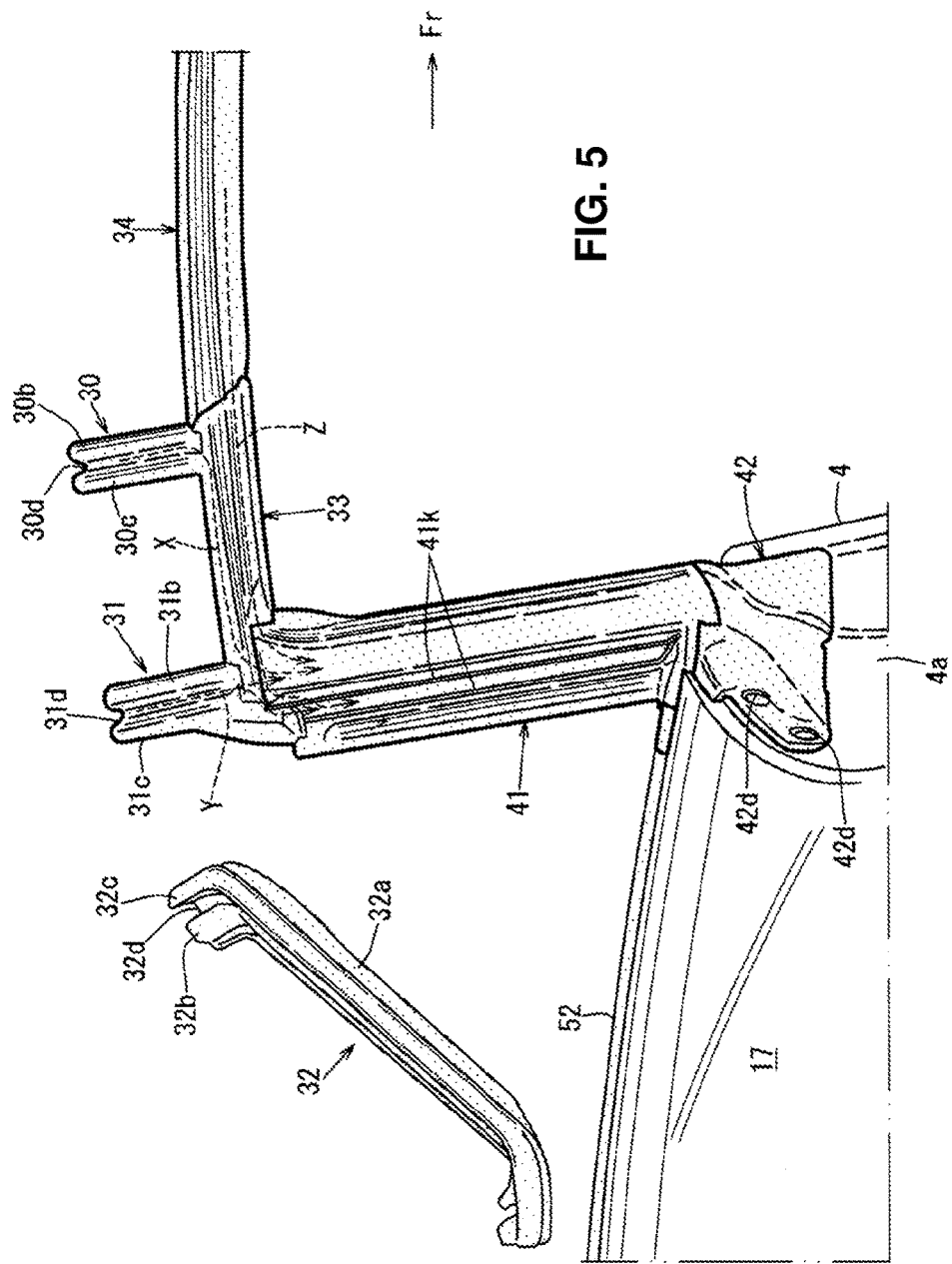
FIG. 5 is a side view showing a seal structure of the automotive vehicle.
Figure 6:
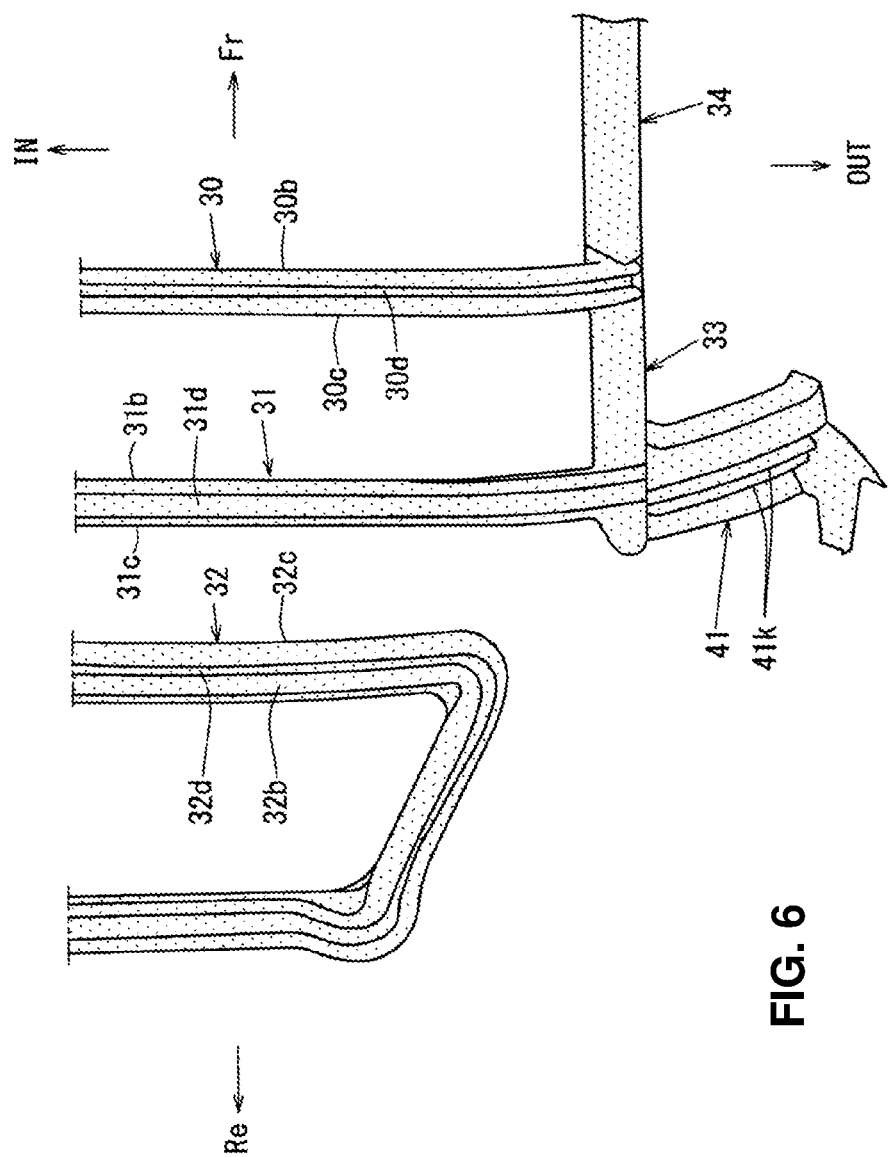
FIG. 6 is a plan view showing the seal structure which is extracted only.

FIG. 5 is a side view showing the seal structure of the automotive vehicle, and FIG. 6 is a plan view showing the seal structure which is extracted only.

As shown in FIGS. 4-6, the front weather strip 30 extends in the vehicle width direction, corresponding to the gap g1 between the front roof 8 and the rear roof 9. Likewise, the rear weather strip 31 extends in the vehicle width direction, corresponding to the gap g2 between the rear roof 9 and the deck cover 12. The ring-shaped weather strip 32 is formed in a loop shape, corresponding to the ring-shaped gap g3 between the deck cover 12 and the glass unit 11.

As shown in FIGS. 5 and 6, a roof-side weather strip 33 is provided at a roof side portion of the rear roof 9 as the second roof member. In the present embodiment, the roof-side weather strip 33 is integrally formed with the front weather strip 30 and the rear weather strip 31.

Meanwhile, as shown in FIGS. 5 and 6, a roof-side weather strip 34 is provided at a roof side portion of the front roof 8 as the first roof member. The roof-side weather strip 34 positioned on the side of the front roof 8 and the roof-side weather strip 33 positioned on the side of the rear roof 9 are configured to be continuous in a vehicle longitudinal direction when the roofs are fully closed.

Figure 7:
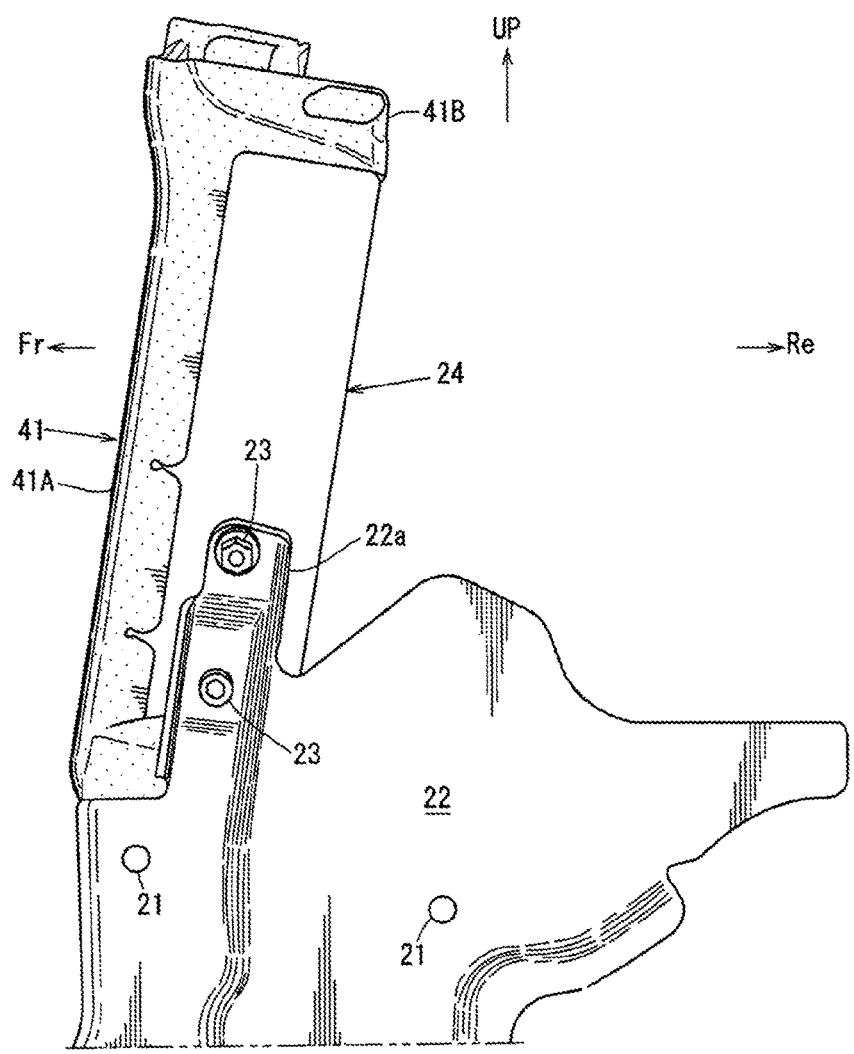
FIG. 7 is an enlarged view of a major part of FIG. 3, which shows an attachment structure of a pillar.
Figure 8:
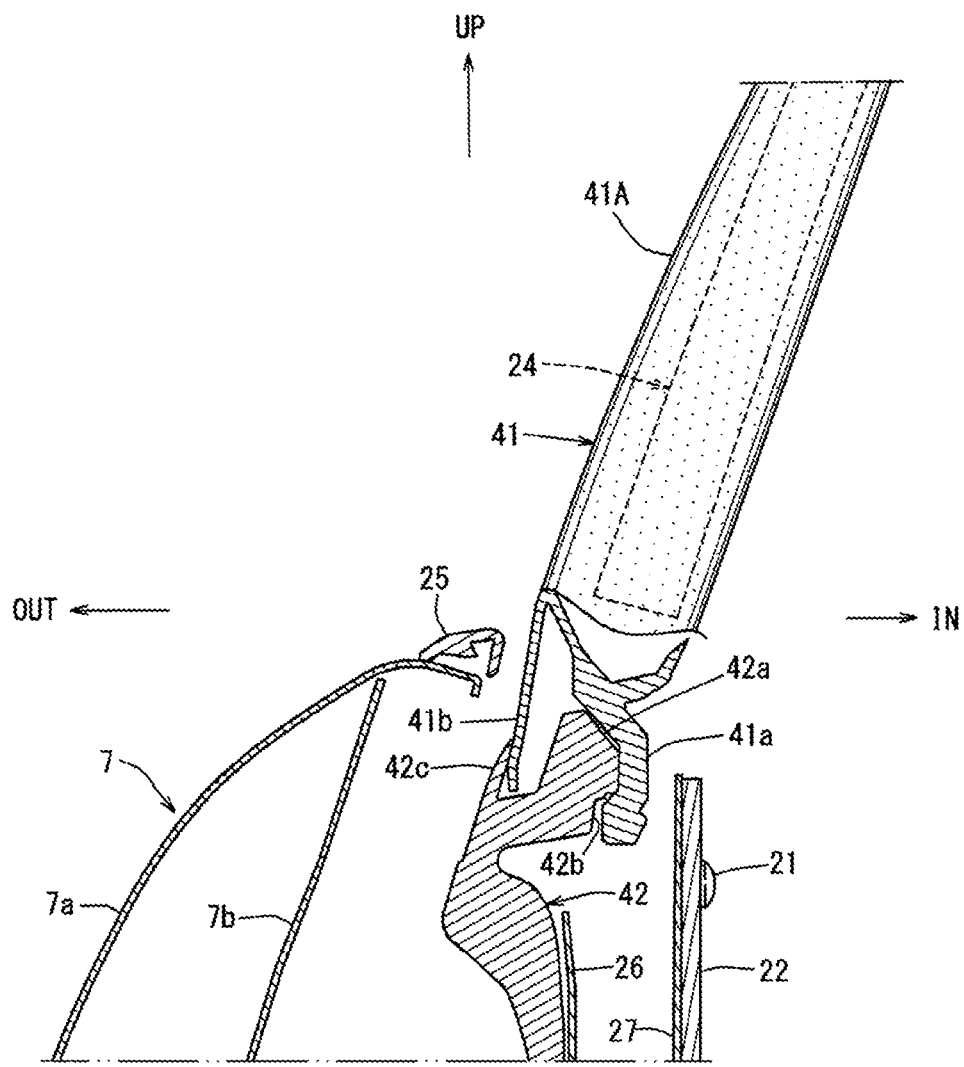
FIG. 8 is a sectional view taken along line S-S of FIG. 2.

FIG. 7 is an enlarged view of a major part of FIG. 3, which shows an attachment structure of the pillar 24, and FIG. 8 is a sectional view taken along line S-S of FIG. 2. As shown in FIGS. 2 and 5-8, a pillar-side weather strip 41 as a vertical weather strip is provided at the pillar 24, and a vehicle-body-side weather strip 42 is attached to a portion of a door-opening portion rear-side forming member 4a which is located right below a beltline as shown in FIG. 5. Herein, the door-opening portion rear-side forming member 4a is positioned on the vehicle-body side of a lower portion of the pillar 24.

As shown in FIG. 7, the pillar-side weather strip 41 comprises a vertical-direction middle portion 41A and an upper portion 41B. The upper portion 41B is configured such that the upper portion 41B covers over the pillar 24 and a rear portion of the roof-side weather strip 33 which is the weather strip positioned on the roof side engages with the upper portion 41B from above.

Figure 9:
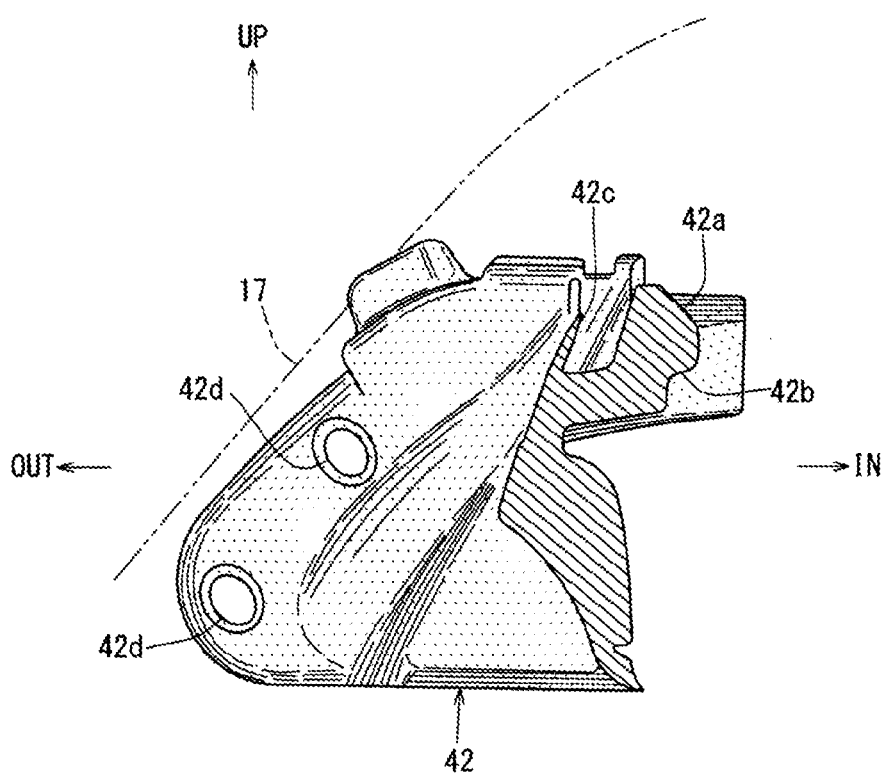
FIG. 9 is a front view of a vehicle-body-side weather strip, which shows a cross section of part thereof.

FIG. 9 is a front view of the vehicle-body-side weather strip 42, which shows a cross section of part thereof. As shown in FIG. 8, the pillar-side weather strip 41 has an engagement portion 41a and a hanging piece 41b which are formed integrally at its lower end portion. The engagement portion 41a is configured such that an inward side, in the vehicle width direction, of the vehicle-body-side weather strip 42 engages with the engagement portion 41a. As show in FIGS. 8 and 9, the vehicle-body-side weather strip 42 comprises a slant-shaped guide portion 42a which guides the engagement portion 41a of the pillar-side weather strip 41 inward in the vehicle width direction and downward, a recess portion 42b which is positioned at a lower portion of the guide portion 42a as an engaged portion, and a wall portion 42c which contacts the hanging piece 41b of the pillar-side weather strip 41 from the outward side in the vehicle width direction.

Thus, the engagement portion 41a of the pillar-side weather strip 41 is guided by the guide portion 42a of the vehicle-body-side weather strip 42 inward and downward, and then made to engage with the recess portion 42b of the vehicle-body-side weather strip 42, thereby attaining positioning. And, the wall portion 42c is made to contact the hanging piece 41b provided at the lower portion of the pillar-side weather strip 41 from the outward side. Accordingly, the sealing can be secured, so that the sealing and the assembling of the pillar 24 which is different member from the roof can be compatibly secured. In particular, this is effective in assembling the storing roof module MO to the vehicle body in a hanging manner.

In FIG. 8, reference character 7a denotes a door outer panel, reference character 7b denotes a door inner panel, reference character 25 denotes a door beltline weather strip, reference character 26 denotes a pillar outer panel, and reference character 27 denotes a pillar inner panel. The pillar outer panel 26 and the pillar inner panel 27 are different members from the above-described pillar 24.

Further, as shown in FIGS. 5 and 9, the vehicle-body-side weather strip 42 is provided with plural attachment holes 42d, 42d which are spaced apart from each other, and the vehicle-body-side weather strip 42 is attached to the door-opening portion rear-side forming member 4a by using the attachment holes 42d, 42d.

FIG. 10A is a sectional view taken along line A-A of FIG. 2, FIG. 10B is a sectional view taken along line B-B of FIG. 2, FIG. 10C is a sectional view taken along line C-C of FIG. 2, and FIG. 10D is a sectional view taken along line D-D of FIG. 2.

Figure 11A:
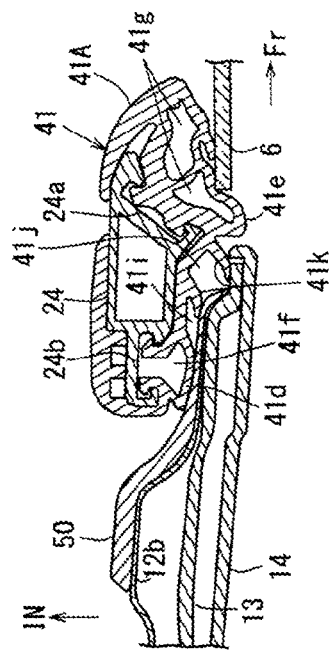
FIG. 11A-11D are sectional views.
Figure 11B:
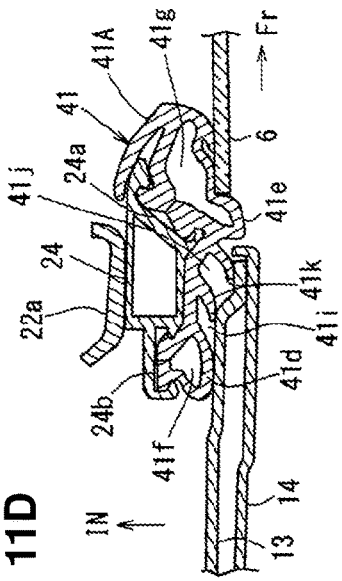
Figure 11C:
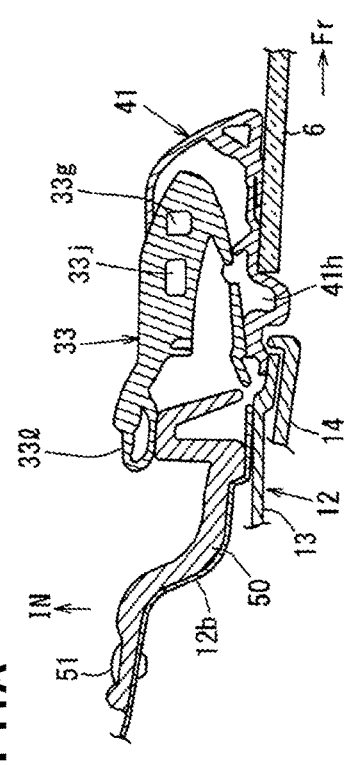
Figure 11D:
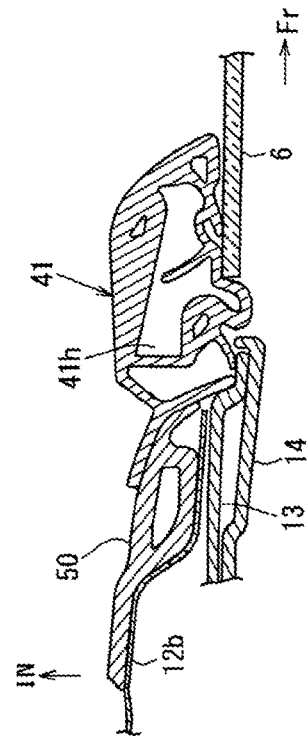

FIG. 11A is a sectional view taken along line E-E of FIG. 2, FIG. 11B is a sectional view taken along line O-O of FIG. 2, FIG. 11C is a sectional view taken along line P-P of FIG. 2, and FIG. 11D is a sectional view taken along line Q-Q of FIG. 2. In FIGS. 10A-10D and 11A-11D, a state where the outer panel 12a of the deck cover 12 is omitted is illustrated, respectively.

Herein, FIG. 10B is a sectional view of a front portion of the roof-side weather strip 33, FIG. 10C is a sectional view of a middle portion, in the longitudinal direction, of the roof-side weather strip 33, and FIG. 10D is a sectional view of the rear portion of the roof-side weather strip 33.

In FIG. 10B, an upper recess groove 33a which extends in the vehicle longitudinal direction is provided to connect to the recess groove 30d, and a lower recess groove 33b is provided below the recess groove 33a to connect to a recess groove (not illustrated) of the roof-side weather strip 34 which is positioned on the front-roof side. Further, a hollow-shaped upper water passage 33c is formed right below the upper recess groove 33a, and a hollow-shaped lower water passage 33d is formed right below the upper recess groove 33a.

These upper-and-lower water passages 33c, 33d are configured such that the upper water passage 33c connects to a rear portion of the upper recess groove 33a, the lower passage 33d connects to a rear portion of the lower recess groove 33b, these water passages 33c, 33d are provided closely to each other at a sectional position shown in FIG. 10C which is located in back of the recess grooves 33a, 33b, and a partition portion 33e is formed between the upper-and-lower water passages 33c, 33d.

The lower water passage 33d connects to a front-side vertical flow passage 41g of the pillar-side weather strip 41, which will be described below, at a hole 33f shown in FIG. 10A, and the recess groove 33m shown in FIG. 10A receives water positioned on a lower-face side of a roof panel, such as dew drops, and connects to the lower water passage 33d and the vertical flow passage 41g at the hole 33g.

The partition portion 33e does not exist at a position of the rear portion of the roof-side weather strip 33 shown in FIG. 10D, where a hollow-shaped joining water passage 33h where the upper water passage 33c joins the lower water passage 33d is formed.

As shown in FIG. 10D, a flow hole 33i is formed at a lower portion of the joining water passage 33h. As shown in FIGS. 10A and 10B, a vertical water passage 33j is formed on the inward side, in the vehicle width direction, of the joining water passage 33h such that the vertical water passage 33j connects to the recess groove 31d and a lower end of the vertical water passage 33j opens to the vertical flow passage 41g which is positioned at a front side of the pillar-side weather strip 41, which will be described later. The above-described flow hole 33i is slender than the hole 33f and extends to a specified position which is located in back of the hole 33f, and is configured such that an effective opening area thereof changes in accordance with the flow amount. Herein, the joining flow passage 33h has a cutout at its rear portion as shown in FIG. 10A, and connects to vertical flow passages 41i, 41j which are positioned at a rear side of the pillar-side weather strip 41, which will be described later. An opening area of the pillar-side weather strip 41 connecting to the vertical flow passages 41i, 41j is larger than the hole 33f and the flow 33i.

As shown in FIGS. 10A, 10B and 10C, a lower portion of the roof-side weather strip 33 engages with the upper-end recess portion 41c of the pillar-side weather strip 41 in a wedge shape at a position where the roof-side weather strip 33 corresponds to the pillar-side weather strip 41, and a lip 33k having a specified longitudinal width is provided at an engagement-joining point of the roof-side weather strip 33. This lip 33 is provided at a specified position which is interposed between the door window glass 6 as another member and an outer surface of the pillar-side weather strip 41 such that the lip 33 is configured to be pressed against the outer surface of the pillar-side weather strip 41 by the door window glass 6. Thus, the door window glass 6 is configured to contact the lip 33k from the outward side, thereby improving the sealing of the engagement-joining point of the above-described both members 33, 41.

In FIGS. 11A-11D, FIG. 11A is a sectional view of the engagement-joining point of the roof-side weather strip 33 and the pillar-side weather strip 41, FIG. 11B is a sectional view of a portion slightly lower than the portion shown in FIG. 11A, FIG. 11C is a sectional view of a portion slightly lower than the portion shown in FIG. 11B which corresponds to an upper portion of the pillar 24, and FIG. 11D is a sectional view which corresponds to a lower portion of the pillar 24.

As shown in FIGS. 11C and 11D, the pillar 34 are configured to include front-and-rear weather strip engagement grooves 24a, 24b which extend in the vertical direction along the pillar 24 and have a roughly identical cross section. In the present embodiment, the pillar 24 is made of extrusion casting or roll forming article of aluminum or aluminum alloy.

As shown in FIGS. 7, 8, 11C and 11D, the vertical-direction middle portion 41A of the pillar-side weather strip 41 is configured to engage with the above-described weather strip engagement grooves 24a, 24b.

Meanwhile, as shown in FIGS. A-C, a seal portion 50 positioned on the side of the deck cover 12 is attached to the inner panel 12b of the deck cover 12 by using a clip 51.

As shown in FIGS. 11C and 11D, the pillar-side weather strip 41 is supported at the pillar 24 as the vehicle-body-side pillar portion, and the pillar-side weather strip 41 comprises a hollow-shaped seal portion 41d for sealing the deck cover 12 and a hollow-shaped seal portion 41e for sealing the door window glass 6 of the side door 7. Vertical flow passages 41f, 41g are formed inside the seal portions 41d, 41g. Herein, the seal portions 41d, 42e are plural partition walls to form the vertical flow passages 41f, 41g.

As shown in FIGS. 11A and 11B, the above-described vertical flow passages 41f, 41g joins at an upper portion of the pillar-side weather strip 41, where a joining portion 41h is formed.

Further, as shown in FIGS. 11C and 11D, vertical ribs 41k, 41k are provided between the above-described front-and-rear seal portions 41d, 41e so as to form flow passages 41i, 41j by contacting the seal portion 50 of the deck cover 12 or the quarter-window arrangement portion 13. While the two-row vertical ribs 41k which extend in the vertical direction are exemplified in the present embodiment, three or more rows of vertical ribs 41k may be provided.

Moreover, as shown in FIGS. 10A and 11A, a hollow-shaped seal portion 331 is integrally formed at an inside part, in the vehicle width direction, of a rear portion of the roof-side weather strip 33 for sealing a space between the inside part, in the vehicle width direction, of the rear portion of the roof-side weather strip 33 and an inside part, in the vehicle width direction, of a front portion of the seal portion 50 positioned on the side of the deck cover 12. The seal portion 50 positioned on the side of the deck cover 12 is pressed against an area from the roof-side weather strip 33 to an upper end portion of the pillar-side weather strip 41 as shown in FIGS. 10A-10D and 11A-11D.

As shown in FIG. 5, there are provided a first flow passage X which distributes water from the front weather strip 30 to the plural flow passages 41i, 41j and the vertical flow passage 41g of the pillar-side weather strip 41 as the vertical weather strip by way of the roof-side weather strip 33, a second flow passage Y which distributes water from the rear weather strip 31 to the plural vertical flow passages 41g of the pillar-side weather strip 41, and a third flow passage Z which is formed at the roof-side weather strip 33 and drains water coming in to a space between the roof-side weather strip 33 and the door window glass 6 of the side door 7, such as a connection portion to the roof-side weather strip 34 positioned on the side of the front roof and/or dew drops and the like positioned on a roof inner face.

Herein, the above-described first flow passage X includes the respective elements 30d, 33a, 33f, 33c, 33h, 33i, 41h disclosed in FIGS. 10A-10D and 11A-11D, the above-described second flow passage Y includes the respective elements 31d, 33j, 41h, and the above-described third flow passage Z includes a flow passage (not illustrated) which is provided at the roof-side weather strip 34 positioned on the side of front roof shown in FIG. 5 and the respective elements 33b, 33g, 33d, 33h, 33i, 33m, 41h disclosed in FIGS. 10A-10D and 11A-11D.

Concerning the above-described first, second, and third flow passages X, Y, Z, the water from the first flow passage X is distributed to the plural flow passages 41i, 41j and the vertical flow passage 41g of the pillar-side weather strip 41, and the water from the second flow passage Y is distributed to the plural vertical flow passages 41g of the pillar-side weather strip 41, whereby the water coming in from the plural gaps g1, g2 (see FIG. 4) is made to flow smoothly, without interfering.

In particular, the first and second flow passages X, Y are configured to independently face and connect to inlets of the plural pillar-side flow passages, so that reverse flowing is properly prevented. Also, the third flow passage Z is configured to extend forward and connect to a drain passage positioned on the side of the front pillar, not illustrated, so that the water dispersion is promoted, thereby the water reverse flowing or leakage are suppressed.

Herein, a gutter member to receive flowing-down water is provided below the vehicle-body-side weather strip 42, a hose which connects to an inner bottom portion of the gutter member is provided, and this hose is configured to open outward below the wheelhouse or below the floor panel, thereby draining the flowing-down water to the vehicle outside.

In FIG. 5, reference character 52 denotes a rear-fender side weather strip. Further, in the figures, an arrow Fr shows a vehicle forward side, an arrow Re shows a vehicle rearward side, an arrow IN shows an inward side in the vehicle width direction, an arrow OUT shows an outward side in the vehicle width direction, and an arrow UP shows a vehicle upward side.

The vehicle-body structure of the automotive vehicle with the storing-type roof according to the present embodiment comprises the pillar 24 attached to the vehicle-body side separately from the roof (see the front roof 8 and the rear roof 9), the pillar-side weather strip 41 provided at the pillar 24, the vehicle-body-side weather strip 42 provided at the vehicle-body side of the lower portion of the pillar 24, and the engagement portion 41a provided at the lower end portion of the pillar-side weather strip 41, the engagement portion 41a being configured to engage from the inward side, in the vehicle width direction, of the vehicle-body-side weather strip 42, wherein the vehicle-body-side weather strip 42 comprises the guide portion 42a which guides the engagement portion 41a of the pillar-side weather strip 41 inward and downward, the engaged portion (see the recess portion 42b) positioned at the lower portion of the guide portion 42a, and the wall portion 42c which contacts the hanging piece 41b provided at the lower end portion of the pillar-side weather strip 41 from the outward side in the vehicle width direction (see FIGS. 8 and 9).

According to the above-described structure, since the pillar 24 provided separately from the roof is attached to the vehicle-body side, the assembling workability of the pillar 24 can be secured. Further, since poisoning of the engagement portion 41a of the pillar-side weather strip 41 is conducted by making the engagement portion 41a engage with the engaged portion (see the recess portion 42b) of the vehicle-body-side weather strip 42 after the engagement portion 41a is guided inward and downward by the guide portion 42a of the vehicle-body-side weather strip 42 and also the wall portion 42c contacts the hanging piece 41b provided at the lower end portion of the pillar-side weather strip 41 from the outward side in the vehicle width direction, the sealing can be secured. That is, both securing of the sealing and the assembling workability of the pillar 24 provided separately from the roof can be compatibly attained.

In the embodiment of the present invention, the pillar 24 includes the weather-strip engagement grooves 24a, 24b which extends in the vertical direction along the pillar 24 and has substantially the identical cross section, and the pillar-side weather strip 41 comprises the vertical-direction middle portion 41A to engage with the weather-strip engagement grooves 24a, 24b and the upper portion 41B to engage with the roof-side weather strip (see the roof-side weather strip 33), covering over the pillar 24 (see FIGS. 7 and 11).

According to this structure, since the upper portion 41B of the pillar-side weather strip 41 is interposed between the pillar 24 and the roof-side weather strip (the roof-side weather strip 33), the sealing by means of the pillar-side weather strip 41 can be secured. Further, since the pillar 24 has substantially the identical cross section, the pillar 24 can be made of extrusion molding or roll forming article, thereby securing the pillar formability. That is, according to this structure, securing of the sealing and securing of the pillar formability can be compatibly attained.

In the embodiment of the present invention, the pillar 24 is attached to the vehicle-body attaching member (see the base bracket 22) of the storing roof module MO (see FIGS. 3 and 7).

According to this structure, when the roof is assembled to the vehicle body in the hanging manner, the pillar 24 can be guided by the vehicle-body-side weather strip 42 even if the pillar 24 is offset inward or outward. Consequently, modularization and the assembling workability of the pillar 24 and the storing roof can be improved.

In correspondence between the present invention and the above-described embodiment, the engaged portion of the present invention corresponds to the recess portion 42b of the embodiment. Likewise, the roof-side weather strip corresponds to the roof-side weather strip 33. However, the present invention should not be limited to the structure of the above-described embodiment.

What is claimed is:

1. A vehicle-body structure of an automotive vehicle with a storing-type roof, comprising:
    a pillar attached to a vehicle-body side separately from the roof;
    a pillar-side weather strip provided at the pillar;
    a vehicle-body-side weather strip provided at a vehicle-body side of a lower portion of the pillar; and
    an engagement portion provided at a lower end portion of the pillar-side weather strip, the engagement portion being configured to engage from an inward side, in a vehicle width direction, of the vehicle-body-side weather strip,
    wherein said vehicle-body-side weather strip comprises a guide portion which guides said engagement portion of the pillar-side weather strip inward and downward, an engaged portion positioned at a lower portion of the guide portion, and a wall portion which contacts a hanging piece provided at the lower end portion of said pillar-side weather strip from an outward side in the vehicle width direction.

2. The vehicle-body structure of the automotive vehicle with the storing-type roof of claim 1, wherein said pillar includes a weather-strip engagement groove which extends in a vertical direction along the pillar and said pillar-side weather strip comprises a vertical-direction middle portion to engage with said weather-strip engagement groove and an upper portion to engage with a roof-side weather strip, covering over said pillar.

3. The vehicle-body structure of the automotive vehicle with the storing-type roof of claim 2, wherein said pillar is attached to a vehicle-body attaching member of a storing roof module.

4. The vehicle-body structure of the automotive vehicle with the storing-type roof of claim 1, wherein said pillar is attached to a vehicle-body attaching member of a storing roof module.

* * * * *